(12) United States Patent
Knauerhase et al.

(10) Patent No.: US 7,310,532 B2
(45) Date of Patent: Dec. 18, 2007

(54) METHOD OF AUTOMATICALLY UPDATING PRESENCE INFORMATION

(75) Inventors: Robert C. Knauerhase, Portland, OR (US); Nikhil M. Deshpande, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 477 days.

(21) Appl. No.: 10/004,568

(22) Filed: Dec. 5, 2001

(65) Prior Publication Data

US 2003/0104819 A1 Jun. 5, 2003

(51) Int. Cl.
*H04Q 7/20* (2006.01)

(52) U.S. Cl. .............................. 455/456.1; 455/404.2; 455/414.1; 455/414.2; 455/456.2; 455/456.3; 455/456.5; 455/456.6; 709/206; 709/207

(58) Field of Classification Search ............. 455/404.2, 455/414.1, 414.2, 414.3, 456.1–457, 466; 709/206, 207
See application file for complete search history.

(56) References Cited

U.S. PATENT DOCUMENTS

| | | | | |
|---|---|---|---|---|
| 5,943,478 | A | * | 8/1999 | Aggarwal et al. .......... 713/201 |
| 6,031,490 | A | * | 2/2000 | Forssen et al. ............. 342/457 |
| 6,347,224 | B1 | * | 2/2002 | Smyth et al. ............... 455/406 |
| 2002/0035605 | A1 | * | 3/2002 | McDowell et al. ......... 709/206 |
| 2002/0065894 | A1 | * | 5/2002 | Dalal et al. ................. 709/206 |

FOREIGN PATENT DOCUMENTS

| | | |
|---|---|---|
| FR | 2805696 | 8/2001 |
| JP | 07-087568 | 3/1995 |
| JP | 08-179028 | 7/1996 |
| JP | 11-122668 | 4/1999 |
| JP | 11-331950 | 11/1999 |
| JP | 2000-286950 | 10/2000 |
| JP | 2000-287249 | 10/2000 |
| JP | 2001-274875 | 10/2001 |
| JP | 03-513571 T2 | 4/2003 |
| JP | 03-517771 T2 | 5/2003 |
| WO | WO-0133879 A1 | 5/2001 |
| WO | WO-01/45322 | 6/2001 |
| WO | WO-0145322 A2 | 6/2001 |

OTHER PUBLICATIONS

Silver et al. "Unified Network Presence Management", Nortel Networks, 2000, 1-6.*
Silver, A. , et al., "Unified Network Presence Management", *Nortel Networks*, (2000),1-6.

* cited by examiner

*Primary Examiner*—Steve M. D'Agosta
(74) *Attorney, Agent, or Firm*—Schwegman, Lundberg & Woessner P.A.

(57) ABSTRACT

A method, apparatus, and signal-bearing media for determining a presence rule for a mobile device and updating presence information for the mobile device when the presence rule is met. The presence rule may have a condition and a corresponding state. When the condition is met, the corresponding state is saved in the presence information. The presence information may also contain reachability information for the mobile device.

3 Claims, 7 Drawing Sheets

| CONDITION TO BE CHECKED | STATE TO BE RETURNED IF CONDITION IS TRUE |
|---|---|
| CURRENT TIME = TIME OF MEETING | DO NOT DISTURB |
| CURRENT TIME = TIME OF TELECONFERENCE | DO NOT DISTURB |
| CURRENT TIME = LUNCH | AVAILABLE |
| ○<br>○<br>○ | ○<br>○<br>○ |

PRESENCE RULES

Fig. 4

METHOD OF AUTOMATICALLY UPDATING PRESENCE INFORMATION

FIELD

This invention relates generally to mobile devices and more particularly to updating presence information for a mobile device.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© Intel, Incorporated, 2001. All Rights Reserved.

BACKGROUND

Many years ago, people lived relatively stationary lives and communicated little with others beyond their immediate circle of family, friends, and close neighbors. Today, the world is much different, and people are much more mobile and have a need for immediate communication with many others who might be far away. In order to communicate with others and cope with their mobile and complex lives, many people carry mobile electronic devices, such as laptop or notebook computers, handheld computers, cellular telephones, pagers, and PDAs (Personal Digital Assistants).

Some of these mobile devices have a rudimentary notion of user presence information. Presence information may include the reachability of a particular user through a certain system (e.g. connection to an instant messaging system) and availability of the user (e.g., the state of a reachable user, such as "available," or "unavailable.") Users employ presence information to gain information about others who are connected to the system and ready to receive communications. Current systems allow the users to explicitly set the state of their presence information, which persists until the user explicitly changes it. For example, users might explicitly and manually set their presence information to "available" when they turn their mobile device on and "unavailable" prior to turning their mobile device off. Users find this manual process to be cumbersome and easily forgotten, which results in inaccurate presence information, hampering its effectiveness.

BRIEF DESCRIPTION OF THE DRAWINGS

FIG. 4 depicts a block diagram of example contents of presence rules, according to an embodiment of the invention.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
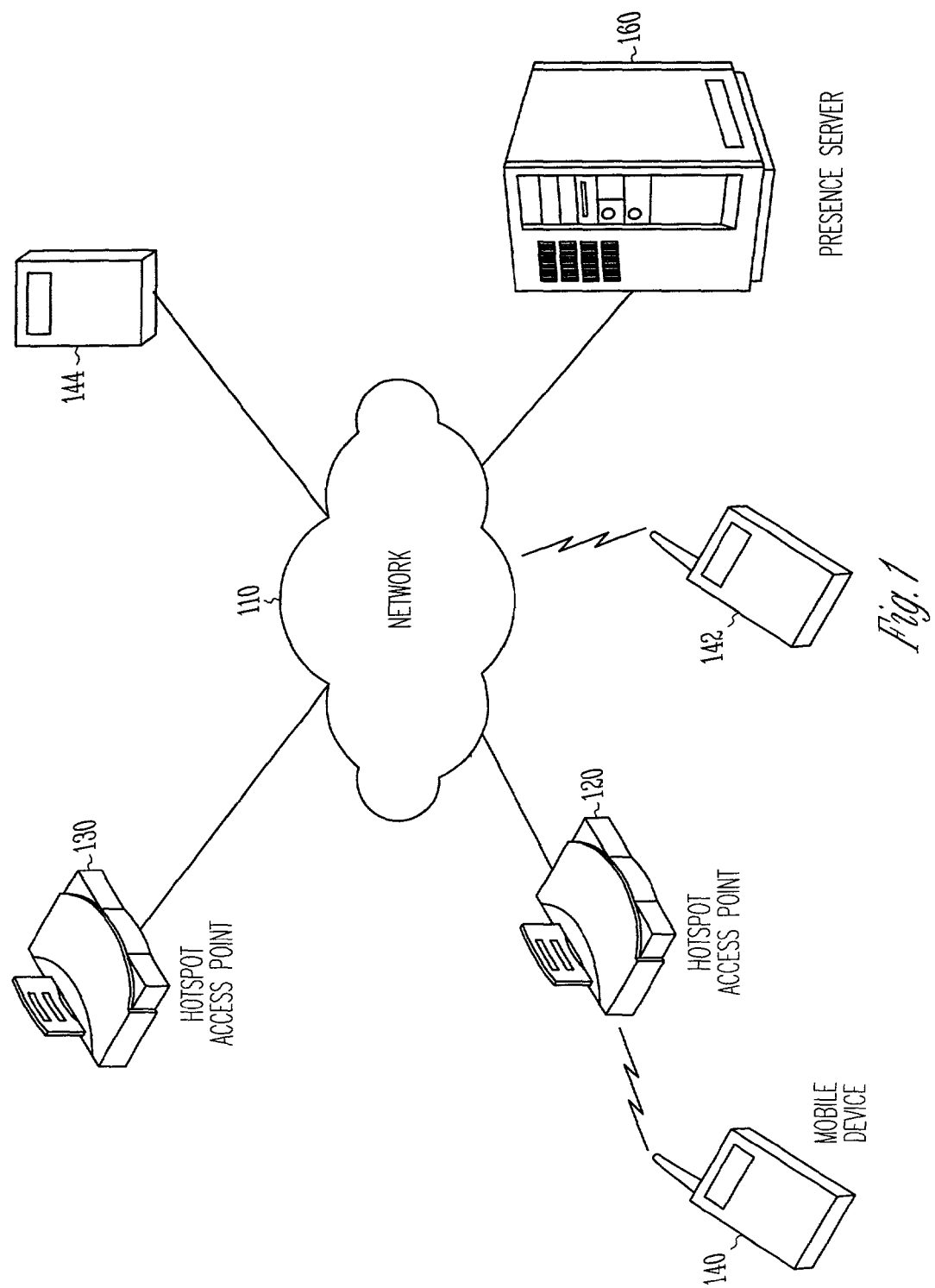
FIG. 1 depicts a schematic overview of the architecture of an embodiment of the invention.

FIG. 1 depicts a schematic overview of the architecture of an embodiment of the invention. According to this embodiment, presence server 160 provides services to mobile devices 140, 142, and 144 via network 110, and hotspot-access points 120 and 130.

Network 110 may be connected to hotspot-access points, such as hotspot-access point 120 and hotspot-access point 130. A hotspot may be a wireless access point electronic device strategically located for providing wireless mobile devices, such as mobile device 140, with access to network 110. Typical hotspots may be in locations such as airports, hotels, restaurants, and stadiums where mobile devices, such as mobile device 140, may want to make a connection to network 110 and obtain services. Although only two hotspot-access points 120 and 130 are shown, in other embodiments any number may be present. In an embodiment, hotspot-access point 120 and/or 130 may be Intel Corporation's PRO/Wireless 2011 LAN Access Point device. In another embodiment, hotspot-access points 120 and/or 130 may be a master or slave device using the Bluetooth radio protocols. In other embodiments, hotspot-access point 120 and/or 130 may be any appropriate hotspot-access point.

Network 110 may be any suitable network and may support any appropriate protocol suitable for communication between mobile devices and presence server 160. In an embodiment, network 110 may support wireless communications. In another embodiment, network 110 may support hard-wired communications, such as a telephone line or cable. In another embodiment, network 110 may be the Internet and may support IP (Internet Protocol). In another embodiment, network 110 may be a local area network (LAN) or a wide area network (WAN). In another embodiment, network 110 may be a hotspot service provider network. In another embodiment, network 110 may be an intranet. In another embodiment, network 110 may be a GPRS (General Packet Radio Service) network. In another embodiment, network 110 may be any appropriate cellular data network or cell-based radio network technology. In another embodiment, network 110 may utilize GPS (Global Positioning System). In another embodiment, network 110 may be an IEEE (Institute of Electrical and Electronics Engineers) 802.11B wireless network. In still another embodiment, network 110 may be any suitable network or combination of networks, such as a hotspot service-provider network combined with the Internet. Although one network 110 is shown, in other embodiments any number of networks (of the same or different types) may be present and various mobile devices may use the same network or different networks.

Mobile device 140 may make a wireless connection with network 110 by moving into the range of hotspot-access point 120 or 130. Although only one mobile device 140 is shown connecting to hotspot-access point 120, in other embodiments, any number may be present. In the example shown, mobile device 140 recognizes that hotspot-access point 120 is available and may choose to register for the services supplied by hotspot-access point 120 if mobile device 140 is configured to accept such services. If mobile device 140 registers with network 110 via hotspot-access point 120, network 110 confirms the access privileges by confirming authorization with one or more authorization servers (not shown). Once authorized, mobile device 140 may then request or accept services that are implemented using presence server 160 and/or other servers and supplied through network 110 and hotspot-access point 120 or 130. Although only one presence server 160 are shown connected to network 110, any number may be present.

Mobile device 142 may make a wireless connection with network 110 without using a hotspot-access point. Mobile device 144 may make a hardwired connection to network 110. Although three mobile devices 140, 142, and 144 are shown, any number may be present and they may connect to network 110 via any combination of means. Mobile devices 140, 142, and 144 are further described below with reference to FIG. 3.

Figure 2:
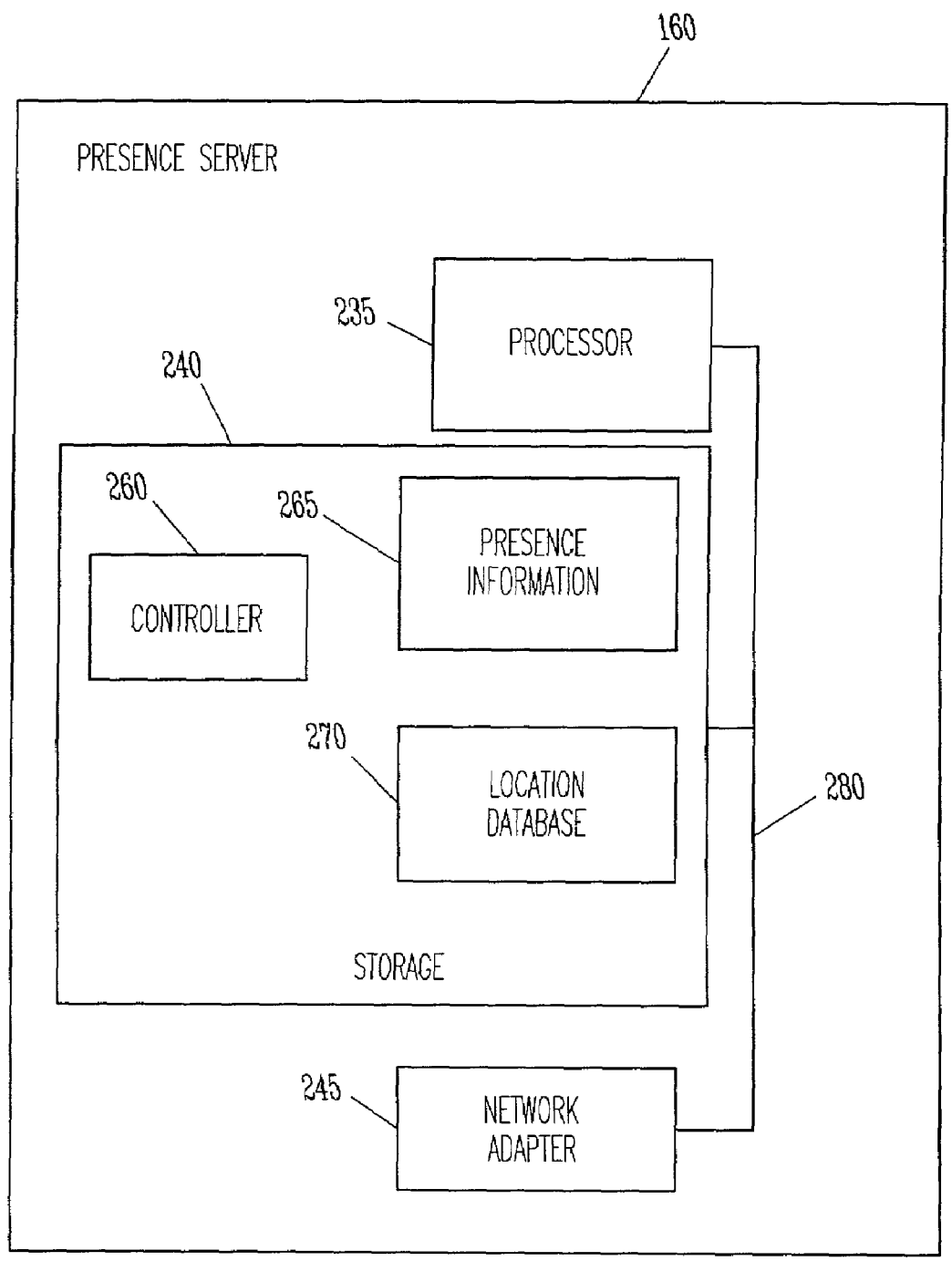
FIG. 2 depicts a block diagram of a presence server, according to an embodiment of the invention.

FIG. 2 depicts a block diagram of presence server 160, according to an embodiment of the invention. Presence server 160 may be a server computer. In an embodiment, presence server 160 may receive and store presence information from mobile devices, such as mobile devices 140, 142, and 144. In another embodiment, presence server 160 may determine presence information for the mobile devices based on data supplied by the mobile devices and/or based on data from other sources, such as GPS, GPRS, and/or hotspots. In an embodiment, presence server 160 may use the presence information to provide instant-messaging services. In another embodiment, presence server 160 may use the presence information to provide two-way alphanumeric pages. In another embodiment, presence server 160 may use the presence information for any appropriate purpose.

Presence server 160 may use any suitable instant-messaging functions, such as those provided by AOL (America Online), Yahoo!, or Microsoft MSN Messenger Service, but any other suitable instant-messaging functions may be used. In another embodiment, presence server 160 may be implemented by a paging service. Presence server 160 may be implemented using any suitable hardware and/or software, such as a personal computer available from a number of vendors. But, other examples may be portable computers, laptop computers, and mainframe computers. The invention is not so limited. Presence server 160 may support any suitable instant-messaging protocol. In an embodiment, presence server 160 may support the Internet Engineering Task Force's (IETF) Instant Messaging and Presence Protocol. In another embodiment, presence server 160 may support any appropriate instant messaging and presence protocol.

Presence server 160 may include processor 235, storage device 240, and network adapter 245, all communicatively coupled via bus 280.

Processor 235 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 235 executes instructions and includes that portion of presence server 160 that controls the operation of the entire server. Although not depicted in FIG. 2, processor 235 typically includes a control unit that organizes data and program storage in memory and transfers data and other information between the various parts of the server. Processor 235 may receive input data from network 110 via network adapter 245, read and store code and data in storage device 240, and may present output data via network adapter 245 to network 110. Processor 235 may transmit and receive packets of information across network 110 using network adapter 245.

Although presence server 160 is shown to contain only a single processor and a single bus, the present invention applies equally to servers that may have multiple processors and to servers that may have multiple buses with some or all performing different functions in different ways.

Storage device 240 represents one or more mechanisms for storing data. For example, storage device 240 may include read-only memory (ROM), random-access memory (RAM), magnetic disk storage media, optical storage media, flash memory devices, and/or other machine-readable media. Although only one storage device 240 is shown, multiple storage devices and multiple types of storage devices may be present. Further, although presence server 160 is drawn to contain storage device 240, the storage device may be distributed across other electronic devices attached via network 110.

Storage device 240 may include controller 260, presence information 265, and location database 270. Of course, storage device 240 may also include additional software and data (not shown), which are not necessary to understanding the invention.

Controller 260 may include instructions capable of being executed on processor 235 to carry out the functions of the present invention, as further described below with reference to FIGS. 6 and 7. In another embodiment, some or all of the functions of the present invention may be carried out via hardware in lieu of a processor-based system.

Presence information 265 includes presence information of mobile devices, including whether they are connected and online or disconnected and offline and information regard how they may be reached. Presence information 265 may also include state information, such as whether the user of the mobile device is available, unavailable, busy, or in a "do not disturb" state. Other states may also be used, and the invention is not so limited.

Location database 270 may include information about the locations of the various mobile devices that presence server 160 serves. The location of a mobile device may be specified in terms of the hotspot-access point that connects the mobile device to network 110. In another embodiment, presence server 160 may determine the location of a mobile device using GPS or GPRS. In another embodiment, location database 270 includes a mapping of location coordinates to buildings, street addressees, or rooms. Although location database 270 is shown to be within presence server 160, in another embodiment location database 270 may be external to presence server 160.

Bus 280 represents one or more busses (e.g., PCI, ISA (Industry Standard Architecture), X-Bus, EISA (Extended Industry Standard Architecture), or any other appropriate buses and bridges (also termed bus controllers).

Network adapter 245 facilitates communication between presence server 160 and network 110. Network adapter 245 provides presence server 160 with a means of electronically communicating information, such as instant messages, presence information, and other data with a remote computing device, such as hotspot-access points 120 and 130 and mobile devices 140, 142, and 144. In another embodiment, network adapter 245 may support distributed processing, which enables presence server 160 to share a task with other devices linked to network 110. Although network adapter 245 is shown as part of presence server 160, in another embodiment they may be packaged separately. Although only one network adapter 245 is shown, in other embodiments, multiple network adapters of the same or of a variety of types may be present.

Presence server 160 may be implemented using any suitable hardware and/or software, such as a personal computer. Portable computers, laptop or notebook computers, mainframe computers, and network computers are examples of other possible configurations. The hardware and software depicted in FIG. 2 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Thus, an embodiment of the invention may apply to any hardware configuration that supports presence information.

Figure 3:
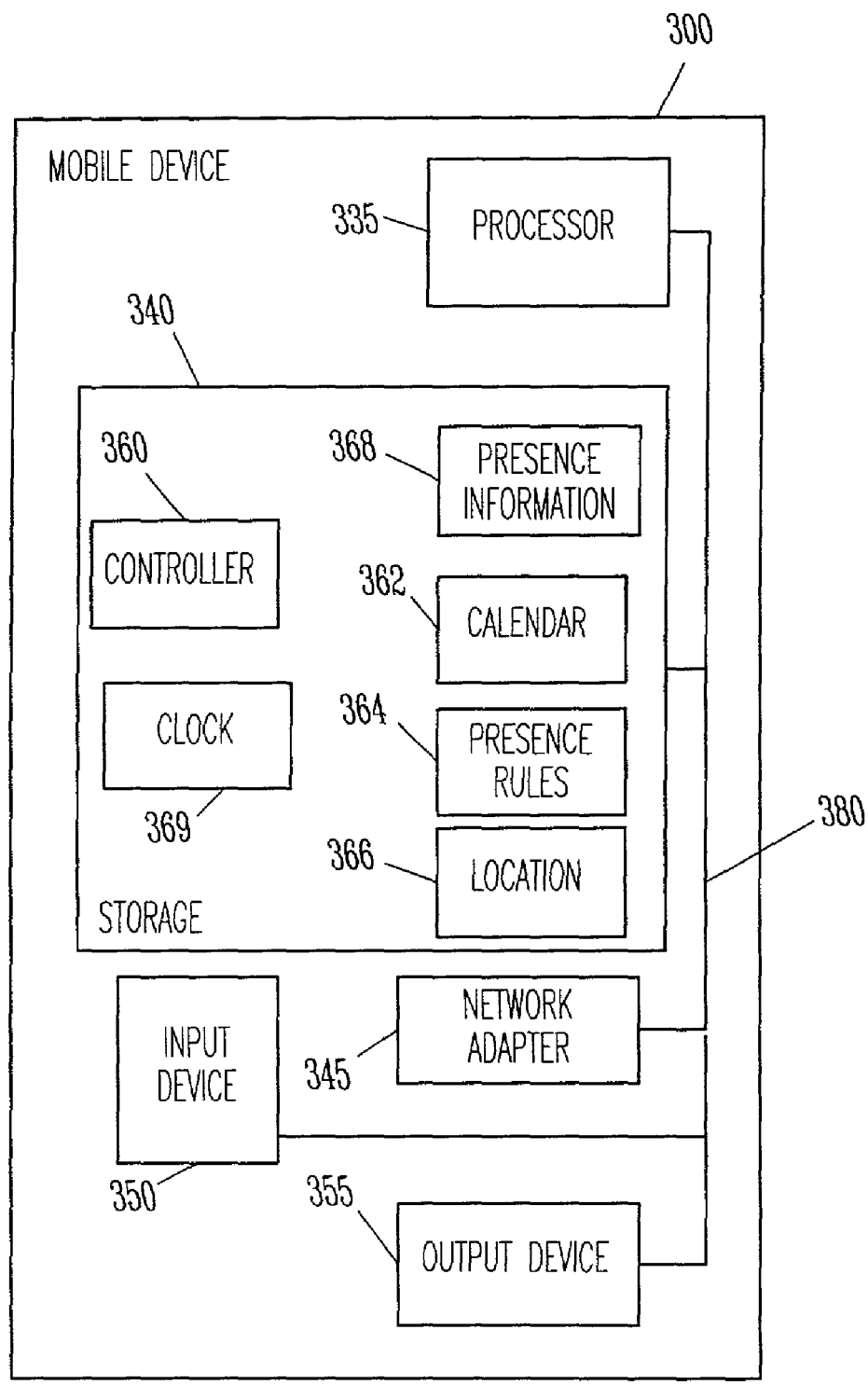
FIG. 3 depicts a block diagram of a mobile device, according to an embodiment of the invention.

FIG. 3 depicts a block diagram of mobile device 300, which includes processor 335, storage device 340, network adapter 345, input device 350, and output device 355, all communicatively coupled via bus 380. Mobile device 300 is capable of sending and/or receiving communications and connecting to network 110 via a hotspot-access point, such as hotspot-access point 120 or 130 or by connecting directly to network 110. Mobile device 300 may represent any or all of mobile devices 140, 142, and/or 144.

Processor 335 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 335 executes instructions and includes that portion of mobile device 300 that controls the operation of the entire mobile device. Although not depicted in FIG. 3, processor 335 typically includes a control unit that organizes data and program storage in computer memory and transfers data and other information between the various parts of the mobile device. Processor 335 may receive input data from input device 350 and network adapter 345, read and store code and data in storage device 340, and may present output data to a user via output device 355. Processor 335 also may transmit and receive packets of information across network 110 via network adapter 345.

Although mobile device 300 is shown to contain only a single processor and a single bus, the present invention applies equally to mobile devices that may have multiple processors and to mobile devices that may have multiple buses with some or all performing different functions in different ways.

Storage device 340 represents one or more mechanisms for storing data. For example, storage device 340 may include read-only memory (ROM), random-access memory (RAM), magnetic disk storage media, optical storage media, flash memory devices, and/or other machine-readable media. Although only one storage device 340 is shown, multiple storage devices and multiple types of storage devices may be present. Further, although mobile device 300 is drawn to contain storage device 340, the storage device may be external to or removable from mobile device 300.

Storage device 340 may include controller 360, calendar 362, presence rules 364, location 366, presence information 368, and clock 369. Of course, storage device 340 may also contain additional software and data (not shown), which is not necessary to understanding the invention.

Controller 360 may include instructions capable of being executed on processor 335 to carry out the functions of the present invention as further described below with reference to FIGS. 6 and 7. In another embodiment, some or all of the functions of the present invention may be carried out via hardware in lieu of a processor-based system.

Calendar 362 may include times, dates, and descriptions of meetings, teleconferences, appointments, and other events, tasks, annotations, and/or notes of interest to the user of mobile device 300. In an embodiment, the user may input entries into calendar 362. In another embodiment, mobile device 300 may download entries into calendar 362 from another electronic device. Although calendar 362 is shown to be within mobile device 300, in another embodiment calendar 362 may be external to mobile device 300 and accessed remotely. In an embodiment, calendar 362 may be implemented using Pocket Outlook, a product of Microsoft Corporation, although any suitable calendar may be used.

Presence rules 364 may include rule conditions and corresponding states. Controller 360 may read the rule conditions, determine if they are met, and if so update presence information 368, as further described below with reference to FIG. 7. Presence rules 364 are further described below with reference to FIG. 4.

Location 366 contains the current location of mobile device 300. Location 366 may be specified in terms of the hotspot-access point that connects mobile device 300 to network 110. In another embodiment, mobile device 300 may determine its location using GPS or GPRS, or any other location-finding technique, or combinations of techniques. In another embodiment, location 366 includes a mapping of location coordinates to buildings, street addressees, or rooms. Although location 366 is shown to be within mobile device 300, in another embodiment location 366 may be external to mobile device 300.

Presence information 368 includes an indication of whether mobile device 300 is online and connected to network 110 or offline and disconnected and information regarding how mobile device 300 may be reached. Presence information 368 may also include state information, such as whether the user of the mobile device is available, unavailable, busy, or in a "do not disturb" state. Other states may also be used, and the invention is not so limited. Although presence information 368 is shown to be within mobile device 300, in another embodiment presence information 368 may be external to mobile device 300 on another electronic device or included within presence server 160. Presence information 368 is further described below with reference to FIG. 5.

Clock 369 is capable of indicating the current time. Although clock 369 is shown to be within mobile device 300, in another embodiment clock 369 may be external to mobile device 300 and accessed remotely. Clock 369 may be implemented in hardware or in software.

Bus 380 represents one or more busses (e.g., PCI, ISA (Industry Standard Architecture), X-Bus, EISA (Extended Industry Standard Architecture), or any other appropriate bus or bridge (also termed a bus controller).

Input device 350 is that part of mobile device 300 that accepts input from a user. In an embodiment, input device 350 may be a keyboard, but in other embodiments, input device 350 may be a pointing device, mouse, trackball, keypad, touchpad, touch screen, pointing stick, microphone, or any other appropriate input device. Although only one input device 350 is shown, in other embodiments any number of input devices of the same or of a variety of types may be present.

Output device 355 communicates information to the user of mobile device 300. Output device 355 may be a cathode-ray tube (CRT) based video display well known in the art of computer hardware. But, in other embodiments output device 355 may be replaced with a liquid crystal display (LCD) based or gas, plasma-based, flat-panel display. In still other embodiments, any appropriate display device may be used. In yet other embodiments, a speaker that produces audio output may be used. Although only one output device 355 is shown, in other embodiments, any number of output devices of different types or of the same type may be present.

Although both input device 350 and output device 355 are shown, in another embodiment only one may be present.

Network adapter 345 facilitates communication between mobile device 300 and network 110. Network adapter 345 provides a means of electronically communicating information, such as instant messages, presence information, and other data with a remote computer, such as presence server 160. In addition, in another embodiment, network adapter 345 may support distributed processing, which enables mobile device 300 to share a task with other devices linked to network 110. Although network adapter 345 is shown as part of mobile device 300, in another embodiment they may be packaged separately. Although only one network adapter 345 is shown, in other embodiments, multiple network adapters of the same or of a variety of types may be present.

Mobile device 300 may be implemented using any suitable hardware and/or software, such as a personal computer or other electronic mobile device. Portable computers, laptop or notebook computers, hand-held devices, PDAs (Personal Digital Assistants), telephones, cellular telephones, smart phones, two-way alphanumeric pagers, and network computers or Internet appliances are examples of other possible configurations of mobile devices. In other embodiments, mobile device 300 may be any suitable type of electronic device capable of being moved from one location to another location. Moreover, mobile device 300 may be embedded within another structure, such as an automobile, motorcycle, airplane, boat, bicycle, or any other kind of moving apparatus.

The hardware and software depicted in FIG. 3 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Thus, an embodiment of the invention may apply to any hardware configuration that supports presence information.

As will be described in detail below, aspects of an embodiment pertain to specific apparatus and method elements implementable on mobile devices and servers. In another embodiment, the invention may be implemented as a program product for use with a mobile device or server.

The programs defining the functions of this embodiment may be delivered to a mobile device or server via a variety of signal-bearing media, which include, but are not limited to:

(1) information permanently stored on a non-rewriteable storage medium (e.g., read-only memory devices within a mobile device or server such as a CD-ROM readable by a CD-ROM drive;

(2) alterable information stored on rewriteable storage media (e.g., a hard disk drive or diskette); or (3) information conveyed to a mobile device or server by a communications medium, such as through a computer or telephone network accessed via network adapter 245 or 345, including wireless communications.

Such signal-bearing media, when carrying processor-readable instructions that direct the functions of the present invention, represent embodiments of the present invention.

FIG. 4 depicts a block diagram of example contents of presence rules 364, according to an embodiment of the invention. Presence rules 364 may include condition 410 and state field 420. Condition field 410 may include the conditions that will be checked, as further described below with reference to FIG. 7. If a condition in condition field 410 is met, then the corresponding state in state field 420 is saved in presence information 265 and/or 368, as further described below with reference to FIGS. 6 and 7.

Figure 5:
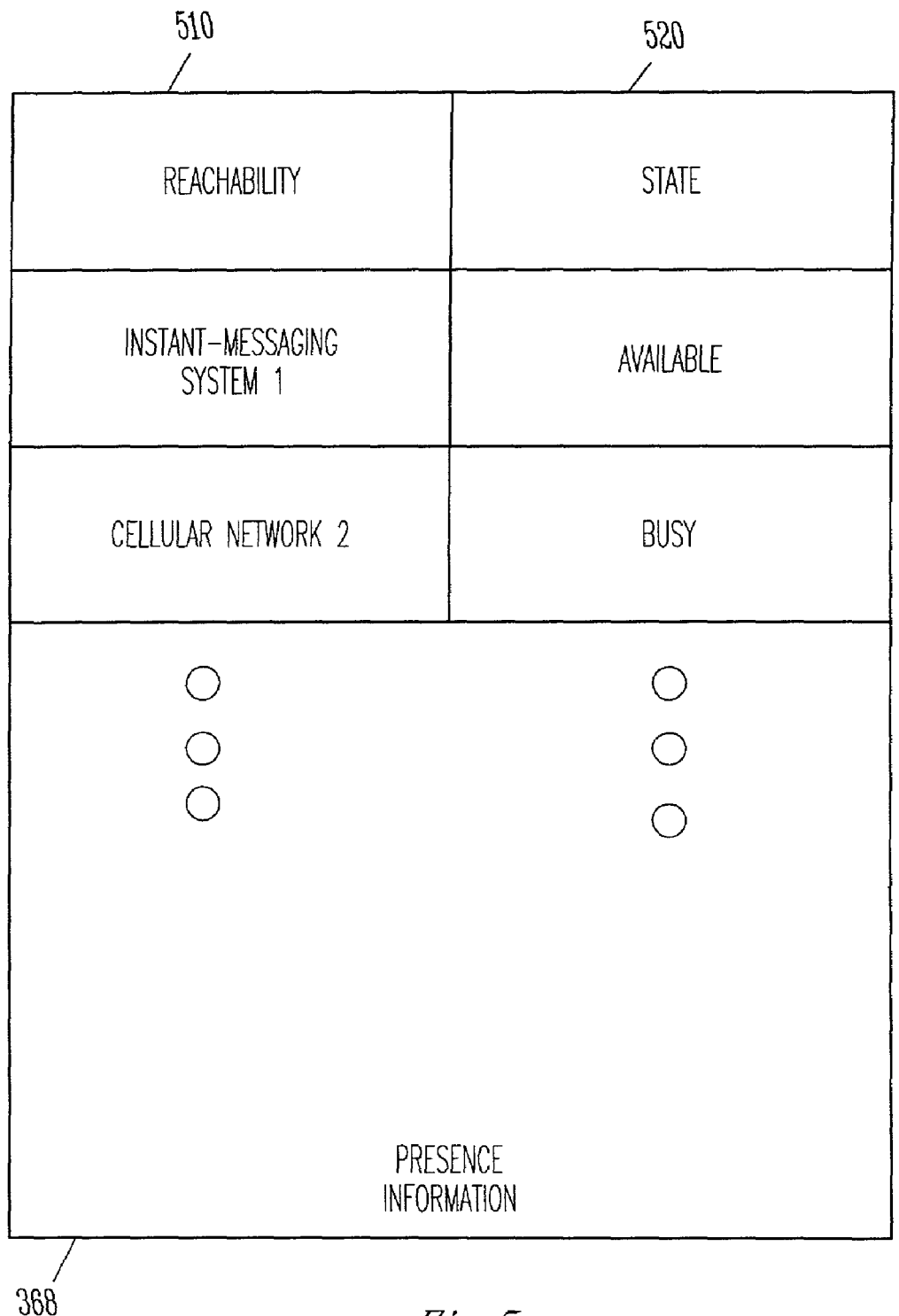
FIG. 5 depicts a block diagram of example contents of presence information, according to an embodiment of the invention.

FIG. 5 depicts a block diagram of example contents of presence information 368, according to an embodiment of the invention. Presence information 368 may include reachability field 510 and state field 520. Reachability field 510 may contain reachability information indicating the system through which mobile device 300 can be reached. The values shown of "instant-messaging system 1" and "cellular network 2" for reachability field 510 are only examples, and any appropriate values may be used. State field 520 may indicate the status of the user of mobile device 300. The values shown of "available" and "busy" for state field 520 are only examples, and any appropriate values may be used.

Figure 6:
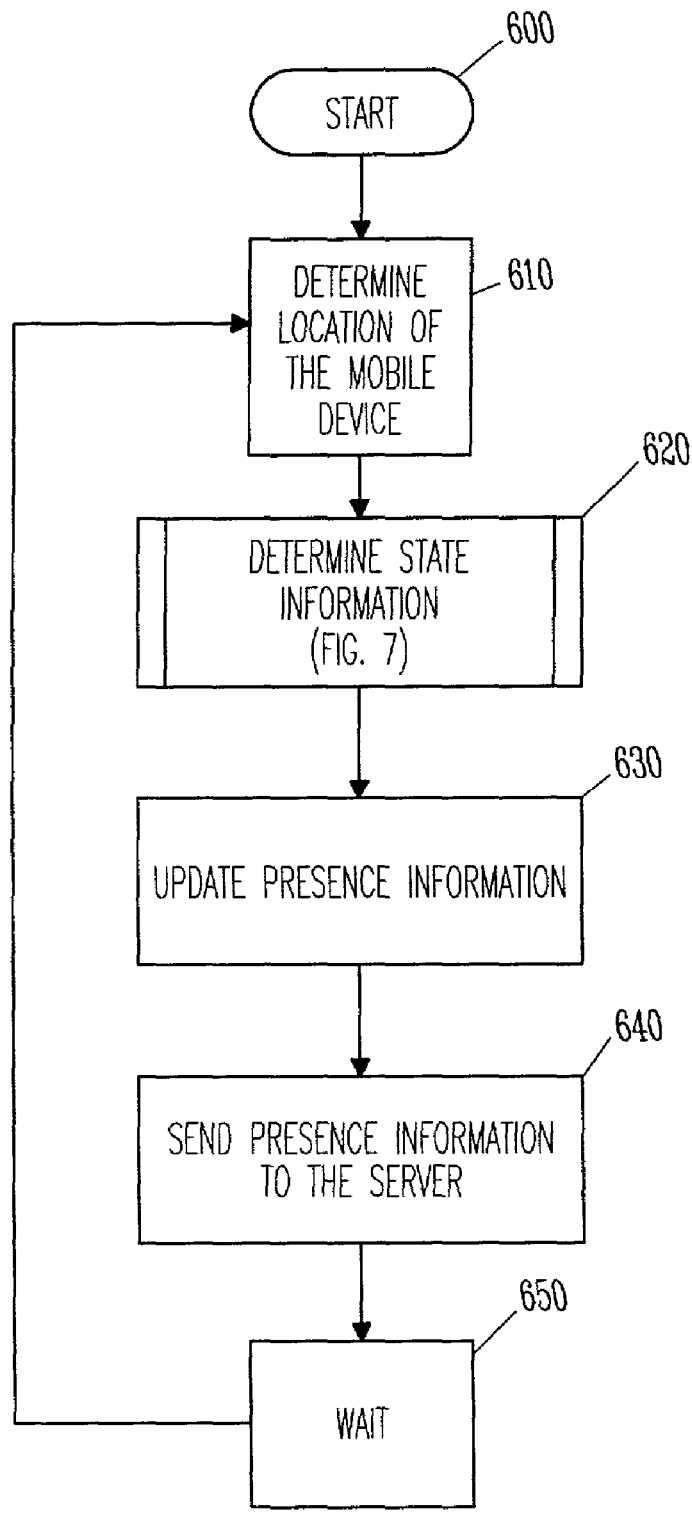
FIG. 6 depicts a flowchart of example processing, according to an embodiment of the invention.

FIG. 6 depicts a flowchart of example processing, according to an embodiment of the invention. Although the processing of FIG. 6 will be described in terms of actions taken by mobile device 300, in another embodiment, some or all of the processing may be performed by presence server 160 using data supplied by mobile device 300 and/or other entities.

Control begins at block 600. Control then continues to block 610 where mobile device 300 determines its location and to what system it is connected. Mobile device 300 saves the determined location in location 366. The location may be determined, for example, using hotspot-access points 120 or 130, GPS, GPRS, or via any other location-determining technique. Control then continues to block 620 where mobile device 300 determines the state of the user of mobile device 300, as further described below with reference to FIG. 7. Referring again to FIG. 6, control then continues to block 630 where mobile device 300 saves the system to which mobile device 300 is connected in reachability field 510 of presence information 368. Also at block 630, mobile device 300 saves the state information previously determined at block 620 in state field 520 of presence information 368.

Control then continues to block 640 where mobile device 300 sends presence information 368 to presence server 160 via network adapter 345 and network 110. Presence server 160 uses the received presence information to update presence information 265 for the particular mobile device 300. Control then continues to block 650 where mobile device 300 waits or sleeps for a period of time. Control then returns to block 610, as previously described above.

Figure 7:
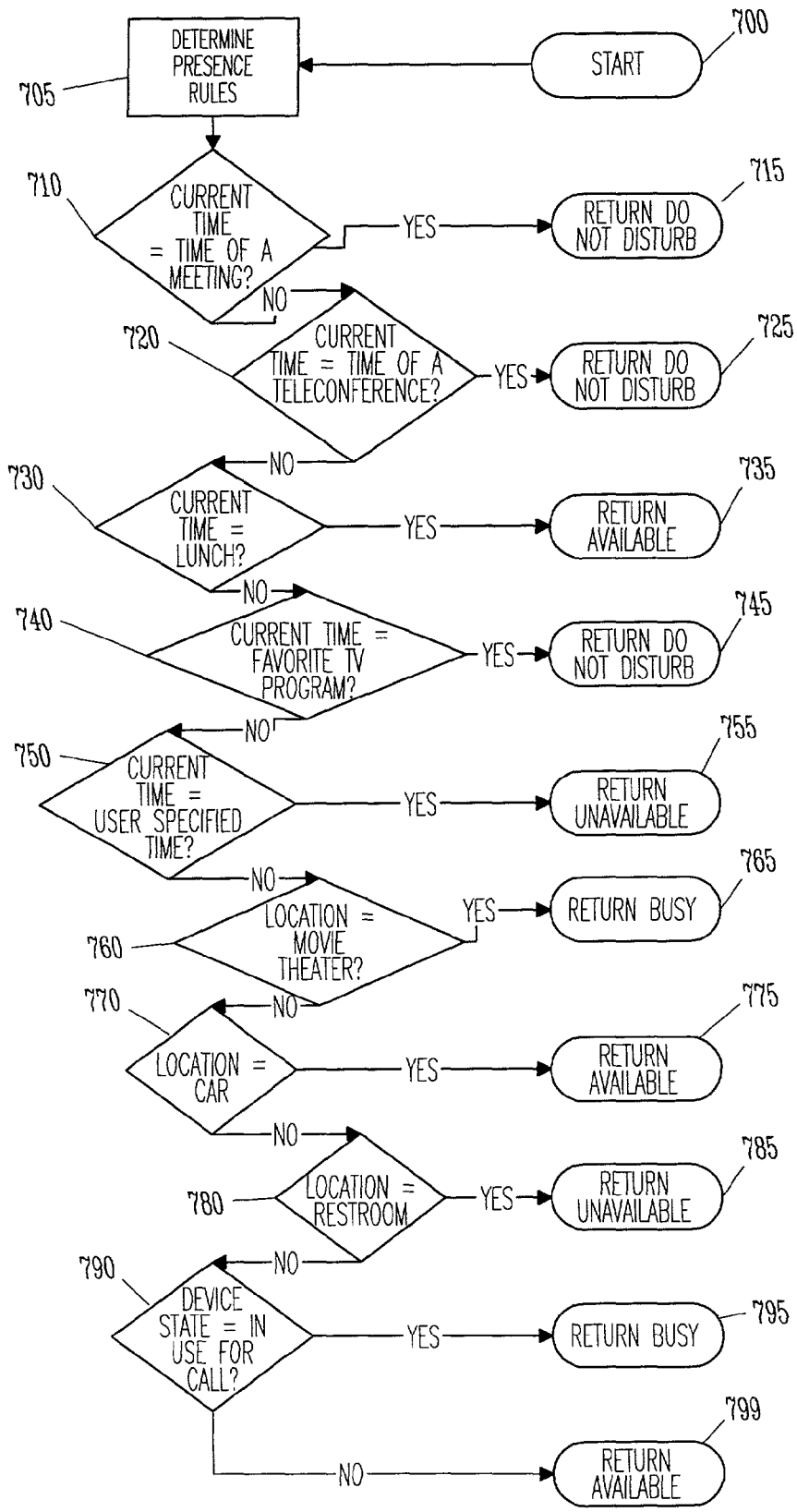
FIG. 7 depicts a flowchart of example processing for determining state information, according to an embodiment of the invention.

FIG. 7 depicts a flowchart of processing for determining state information, according to an embodiment of the invention. Although the processing of FIG. 7 will be described in terms of mobile device 300, in another embodiment, some or all of the processing may be performed by presence server 160 using data supplied by mobile device 300 and/or other entities.

Control begins at block 700. Control then continues to block 705 where mobile device 300 determines presence rules 364, which mobile device 300 may use to determine presence information 368. In an embodiment, mobile device 300 may query the user to input presence rules 364 or a portion of presence rules 364. In another embodiment, mobile device 300 may load presence rules 364, or a portion of presence rules 364, from presence server 160. In another embodiment, mobile device 300 may load presence rules 364, or a portion of presence rules 364, from another unillustrated server attached to network 110. The remaining blocks of FIG. 7 are implemented using presence rules 364 and are only examples of rule conditions and corresponding states that may be used, as indicated in the example of FIG. 4. But, any appropriate rule conditions and corresponding states may be used, and the invention is not so limited.

Referring again to FIG. 7, control then continues to block 710 where mobile device 300 determines whether the current time as indicated by clock 369 is within a meeting time indicated in calendar 362. If the determination at block 710 is true, then control continues to block 715 where the "do not disturb" state is returned to the logic of FIG. 6. In another embodiment, mobile device 300 determines its location and returns "do not disturb" only if the determined location matches the location of the meeting room as indicated in calendar 362. Thus, if the mobile device is not actually in the meeting room, then the user may still be available even though the calendar indicates the user is supposed to be in the meeting.

If the determination at block 710 is false, control then continues to block 720 where mobile device 300 determines whether the current time as indicated by clock 369 is within a teleconference time indicated in calendar 362. If the determination at block 720 is true, then control continues to block 725 where the "do not disturb" state is returned to the logic of FIG. 6.

If the determination at block 720 is false, control then continues to block 730 where mobile device 300 determines whether the current time as indicated by clock 369 is within the lunch time indicated in calendar 362. If the determination at block 730 is true, then control continues to block 735 where the "available" state is returned to the logic of FIG. 6.

If the determination at block 730 is false, control then continues to block 740 where mobile device 300 determines whether the current time as indicated by clock 369 is within the time of the television program specified in presence rules 364. In an embodiment, the name or other identifier of the television program is specified in presence rules 364 and mobile device 300 determines the time of the identified television program by accessing an unillustrated server in network 110. In another embodiment, presence rules 364 specifies the time of the television program. If the determination at block 740 is true, then control continues to block 745 where the "do not disturb" state is returned to the logic of FIG. 6.

If the determination at block 740 is false, control then continues to block 750 where mobile device 300 determines whether the current time as indicated by clock 369 is within a user-specified time. If the determination at block 750 is true, then control continues to block 755 where the "unavailable" state is returned to the logic of FIG. 6.

If the determination at block 750 is false, control then continues to block 760 where mobile device 300 determines whether location 366 indicates that the mobile device is at a movie theater. If the determination at block 760 is true, then control continues to block 765 where the "busy" state is returned to the logic of FIG. 6.

If the determination at block 760 is false, control then continues to block 770 where mobile device 300 determines whether location 366 indicates that the mobile device is in a car. If the determination at block 770 is true, then control continues to block 775 where the "available" state is returned to the logic of FIG. 6.

If the determination at block 770 is false, control then continues to block 780 where mobile device 300 determines whether location 366 indicates that the mobile device is in a restroom. If the determination at block 780 is true, then control continues to block 785 where the "unavailable" state is returned to the logic of FIG. 6.

If the determination at block 780 is false, control then continues to block 790 where mobile device 300 determines whether the mobile device is currently receiving a call, page, message, or other communication. If the determination at block 790 is true, then control continues to block 795 where the "busy" state is returned to the logic of FIG. 6.

If the determination at block 790 is false, then control continues to block 799 where the "available" state is returned to the logic of FIG. 6.

What is claimed is:

1. A method, comprising:
    determining at least two presence rules, wherein each presence rule comprises at least a condition and a state, wherein a first condition is based on a location of a mobile device, wherein the location is a specific room, and wherein a second condition is based on a calendar, including a specific time when the mobile device is to be in the specific room;
    wherein determining the at least two presence rules comprises querying the mobile device for the at least two presence rules;
    based upon a current time and a current location of the mobile device, determining whether the first and second conditions are met, including whether the mobile device is inside or outside of the specific room at the current time;
    wherein the current location of the mobile device is determined using a hotspot-access point with which the mobile device communicates;
    when either or both of the conditions are met, updating presence information for the mobile device with the corresponding states;
    wherein if the mobile device is inside the specific room at the current time, indicating that the mobile device should not be disturbed; and
    wherein if the mobile device is outside the specific room at the current time, indicating that the mobile device is available.

2. The method of claim 1, wherein the specific room is a meeting room.

3. The method of claim 1, wherein the specific room is a movie theater.

* * * * *